United States Patent [19]

Karlsson

[11] 4,440,268
[45] Apr. 3, 1984

[54] BRAKE LEVER FOR AN S-CAM AUTOMOTIVE DRUM BRAKE

[75] Inventor: Sven I. K. Karlsson, Lomma, Sweden

[73] Assignee: SAB Automotive AB, Landskrona, Sweden

[21] Appl. No.: 287,747

[22] PCT Filed: Dec. 1, 1980

[86] PCT No.: PCT/SE80/00307
§ 371 Date: Jul. 31, 1981
§ 102(e) Date: Jul. 31, 1981

[87] PCT Pub. No.: WO81/01732
PCT Pub. Date: Jun. 25, 1981

[30] Foreign Application Priority Data

Dec. 13, 1979 [SE] Sweden ............................. 7910263

[51] Int. Cl.³ ............................................. F16D 65/56
[52] U.S. Cl. ........................... 188/79.5 K; 192/111 A
[58] Field of Search ............... 188/79.5 K, 196 BA; 192/111 A

[56] References Cited

U.S. PATENT DOCUMENTS

| | | | |
|---|---|---|---|
| 3,351,163 | 11/1967 | Sander et al. | 188/79.5 K X |
| 3,392,810 | 7/1968 | Svensson | 188/196 BA |
| 3,428,154 | 2/1969 | Lodjic et al. | 188/196 BA |
| 3,526,303 | 9/1970 | Lodjic et al. | 188/79.5 K X |
| 3,921,765 | 11/1975 | Swander Jr. | 188/196 BA X |
| 4,019,612 | 4/1977 | Mathews et al. | 188/79.5 K X |

FOREIGN PATENT DOCUMENTS

| | | | |
|---|---|---|---|
| 2506428 | 8/1975 | Fed. Rep. of Germany . | |
| 1091663 | 5/1965 | United Kingdom | 188/79.5 K |

OTHER PUBLICATIONS

Industriel Teknik, No. 9, issued 1974, Stockholm, "Patentprofylax 34/74" p. 43.

Primary Examiner—George E. A. Halvosa
Attorney, Agent, or Firm—Laurence R. Brown

[57] ABSTRACT

A brake lever for an automotive S-cam drum brake (1-3) has a worm wheel (12) for attachment to an S-cam shaft (5) and meshing with a worm screw (20) on a worm screw shaft (19), and a control arrangement (13, 14, 18, 25) including a control ring (25) rotatable on the worm screw shaft (19). In a force transmitting chain between the control ring and the worm screw shaft there is a clutch sleeve (26), a one-way clutch (28), a clutch ring (27) and a torque limiting clutch (32) biased into engagement by a strong spring (22) on the worm screw shaft, a control distance (A) in the form of a cicumferential play being formed between the control ring and the clutch sleeve, which are biased towards a predetermined initial relative cicumferential position by a spring (33).

4 Claims, 4 Drawing Figures

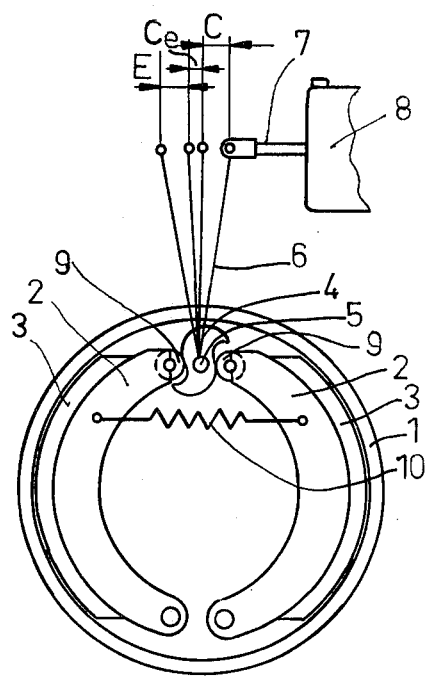
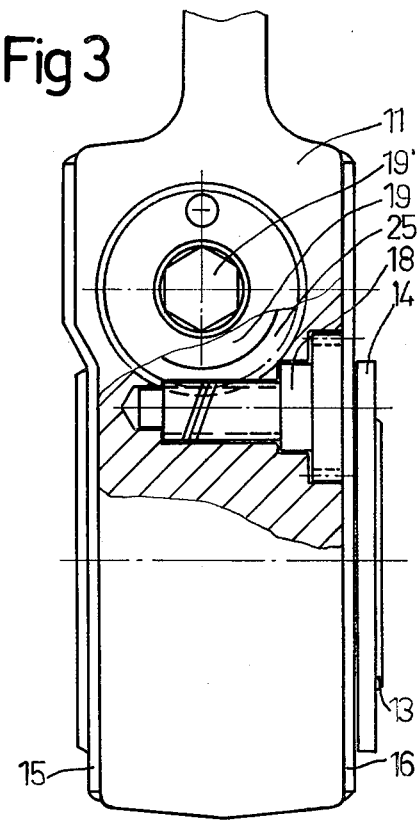
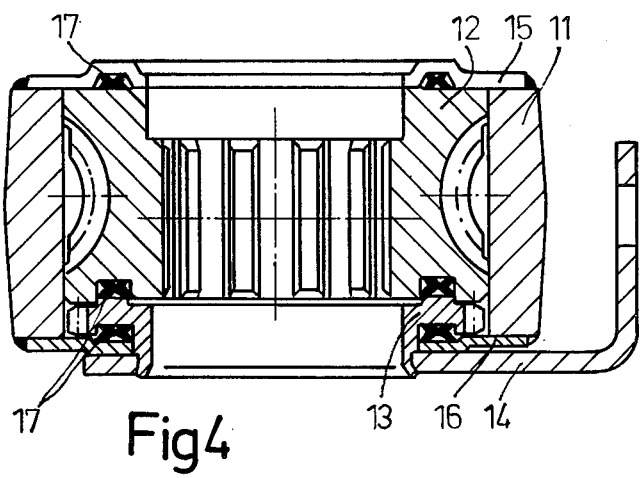

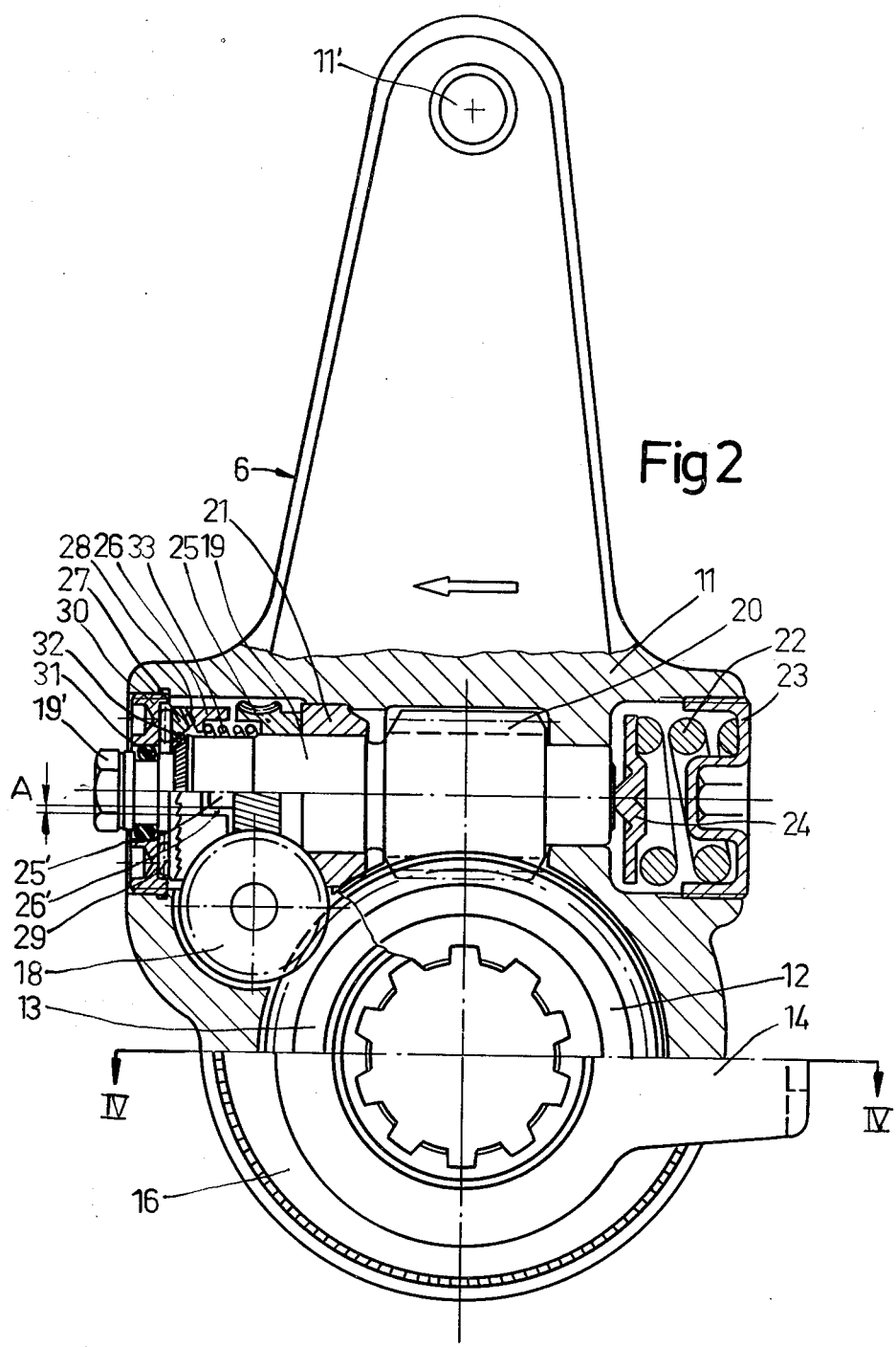

BRAKE LEVER FOR AN S-CAM AUTOMOTIVE DRUM BRAKE

This invention relates to a brake lever for attachment to a splined S-cam shaft of an automotive drum brake and connection to a brake cylinder push rod, including (a) a worm wheel rotatably mounted in a housing of the brake lever and preferably having internal splines for cooperation with the S-cam shaft, and a worm screw shaft rotatable in the housing perpendicular to the worm wheel and having a fixed worm screw meshing with the worm wheel, and (b) a control arrangement for transmitting a control movement from a reference point to a control ring, which is rotatable on the worm screw shaft, depending on the angular movement of the brake lever.

BACKGROUND ART

Especially for heavy road vehicles, such as trucks and buses, so called S-cam drum brakes are often used. Within the brake drum brake shoes provided with brake linings may be pressed apart by means of a generally S-shaped cam rotatable with a shaft (called the S-cam shaft) extending out of the brake drum. A lever, called the brake lever, attached to the S-cam shaft is connected to a push rod of a preferably pneumatic brake cylinder in the vehicle underframe. Thus, at the admission of air under pressure to the brake cylinder a brake force will be transmitted from said push rod via the brake lever to the S-cam shaft and the S-cam, which will press apart the brake shoes and thus apply the brakes.

When wear of the brake linings occurs, a longer stroke of the brake cylinder push rod will be necessary before the brake is applied. Earlier it was customary to manually compensate for this wear by adjusting the angular position of the brake lever relative to the S-cam shaft, preferably by manually turning a shaft of a worm screw in engagement with a worm wheel, which is attached to the S-cam shaft.

Later it has become common to provide the brake lever with internal means for automatically turning the worm screw shaft and thus adjusting the angular position of the brake lever in dependence on the brake lining wear; a so equipped lever is in the art called an automatic brake lever.

Most of the designs for such automatic brake levers are based on the so called piston stroke principle, i.e. the adjustment depends entirely on the piston rod or push rod stroke or in other words the angular movement of the brake lever past a certain value corresponding to the normal clearance between the brake linings and the brake drum in the rest position.

More recently it has been found that different reasons speak for a more advanced principle—the so called clearance sensing principle. In this case the adjusting mechanism is able to differentiate between the push rod stroke depending on the wear of the brake linings and that depending on the often considerable elasticity in the different parts between the brake cylinder and the brake drum. This means that the automatic adjustment reduces the clearance to the normal and desired value when it has become excessive, due for example to wear of the brake linings, whereas the mechanism ignores the influence of the elasticity.

Such clearance sensing automatic brake levers or slack adjusters are for example known through U.S. Pat. No. Re. 26 965, U.S. Pat. Nos. 3,507,369, 3,901,537, 4,114,733, 4,121,703, 3,997,035, 3,997,036, 4,015,692 and 4,019,612.

Different requirements are imposed on a product of this kind. Generally speaking an automatic brake lever is a safety device working under extremely hard conditions as regards loads and environment. Further, the available space for the brake lever is often very limited. The reliability must be high and the periods between normal services as long as possible. Last but not least the price must be competitive.

Still further it is desirable to obviate the necessity for mounting the brake lever in a certain predetermined position, which is inconvenient not only at the initial mounting but even more after later servicing. The automatic brake lever shall thus preferably have a so called floating reference point or fixpoint.

DISCLOSURE OF INVENTION

All these different requirements for a brake lever as initially defined are according to the invention fulfilled if in a force transmitting chain between the control ring and the worm screw shaft there is a clutch sleeve, a one-way clutch, a clutch ring and a torque limiting clutch biased into engagement by a spring force on the worm screw shaft, a control distance in the form of a circumferential play being formed between the control ring and the clutch sleeve, which are biased towards a predetermined initial relative circumferential position by a spring force.

The different members necessary for performing the desired function (especially the members for defining the control distance) are thus collected as a kind of a unit between the control ring and the worm screw shaft.

Further in this unit a helical spring is arranged between the control ring and the clutch sleeve and acts as a torsion spring for establishing said initial relative circumferential position but also as a compression spring for biasing the one-way clutch in the form of a lock teeth clutch into engagement.

The control ring and the clutch sleeve are preferably provided with minor recesses for the ends of the helical compression spring for enabling the spring to act as a torsion spring.

Practically, the control distance may be attained in that the control ring is provided with an axial pin and the clutch sleeve with an axial notch with a circumferential width corresponding to the control ring pin width plus the control distance.

The clutch between the clutch ring and the worm screw shaft may be a conical clutch, preferably serrated for ensuring a proper engagement.

The control arrangement for the brake lever ending with the control ring on the worm screw shaft shall have certain properties. Preferably the mechanism shall be slow-acting, which means that only a fraction of the whole excessive slack is to be reduced at each brake application. The control arrangement must therefore have a certain reduction. A practical solution to the problem of obtaining a satisfactorily high ratio in a design as described above may according to the invention be attained in that the control ring is a control worm ring or wheel, which via a control gear wheel cooperates with a control disc for connection to a fixed part of a vehicle underframe, preferably by means of a control arm, the control gear wheel, which is substantially perpendicular to the worm screw shaft, having a control worm wheel and a control gear wheel portion meshing with gear teeth on the control disc, which is coaxial with the worm wheel of the brake lever.

BRIEF DESCRIPTION OF DRAWINGS

The invention will be described in further detail below reference being made to the accompanying drawings, in which FIG. 1 is a schematic view of a typical S-cam brake arrangement, FIG. 2 is a side view, partly in cross section, of an automatic brake lever according to the invention, FIG. 3 is an end view, partly in cross section, of the lever as viewed from the left in FIG. 2, and FIG. 4 is a section along the line IV—IV in FIG. 2.

DESCRIPTION OF A PREFERRED EMBODIMENT

A typical example of an S-cam drum brake arrangment, especially for a heavy road vehicle, such as a truck, trailer, or bus, is schematically shown in FIG. 1.

In a rotary brake drum 1 two non-rotatable shoes 2 with brake linings 3 are arranged in a manner wellknown to any person skilled in the art. An S-shaped cam 4 is attached to a rotatable cam shaft 5 extending out of the brake itself. A lever 6 (shown in four different positions to be described below) is also attached to the cam shaft 5 and is at its other end connected to a push rod 7 of a brake fluid operated brake cylinder 8. The S-cam 4 cooperates with rollers 9 in the respective ends of the brake shoes 2. It is apparent that at a sufficient counterclockwise turning of the S-cam 4 under the action of the brake cylinder 8 the brake linings 3 will brakingly cooperate with the brake drum 1. A tension spring 10 is provided between the brake shoes 2 in order to release the brake and to keep the brake shoe rollers 9 in constant contact with the S-cam 4 also at the clockwise return movement of the latter.

The angular movement of the lever 6 during a normal brake application may be divided in different parts as indicated in FIG. 1. The first part C corresponds to the normal and desired slack or clearance between the brake linings 3 and the brake drum 1. The second part $C_e$ corresponds to the non-desired excessive slack or clearance due to brake lining wear and so on. The third part E corresponds to the elasticity, which, during a brake application, occurs in the brake drum, brake linings and different parts in the force transmitting chain from the brake cylinder; the elasticity part E of the total brake application stroke will normally increase with increasing brake force.

The lever 6, only shown as a straight line in FIG. 1, is in the art called a brake lever. This brake lever is conventionally often provided with manual means for adjusting its angular position relative to the S-cam from time to time so as to compensate for the excessive clearance $C_e$. These adjustment means are nowadays often automatic, and in such a case the brake lever is called an automatic brake lever or sometimes an automatic slack adjuster. In this description the term brake lever will be used, whereas the term slack adjuster will be reserved for the inventive, automatic slack adjusting means contained in the brake lever, as will now be described in detail under reference to FIGS. 2–4, especially FIG. 2.

A slack adjusting mechanism according to the invention is contained in a housing 11 having a hole 11' in its upper end or arm for connection to the brake cylinder push rod 7. This arm is shown as straight but may, depending on the available space and other circumstances on the actual vehicle, have any suitable shape and length.

In the lower part of the housing 11 a rotatable worm wheel 12 is arranged. By means of splines as shown it is to be attached to the correspondingly splined S-cam shaft 5 (FIG. 1).

A control disc 13 is independently rotatably arranged coaxial with the worm wheel 12, and a control arm 14 for attachment to a fixed part of a vehicle underframe and thus for forming a reference part is united with the control disc 13 and extends out of the housing 11.

A rear cover 15 and a front cover 16 are attached, for example welded, to the housing at the worm wheel 12 and the control disc 13 respectively. O-ring sealings 17 are provided between the back cover 15 and the worm wheel 12, between the worm wheel 12 and the control disc 13, as well as between the control disc 13 and the front cover 16 for preventing dirt, moist and the like from entering the mechanism.

The control disc 13 is at its outer periphery provided with teeth for cooperation with corresponding teeth on a control gear wheel 18, which is rotatably arranged in the housing 11 parallel to the contact disc 13 and the worm wheel 12.

Perpendicular to the axis of the worm wheel 12 a worm screw shaft 19 is rotatably arranged in the housing 11. Integrated therewith or fixedly secured thereto is a worm screw 20 meshing with the worm wheel 12. At its right hand end, as viewed in FIG. 2, the worm screw shaft 19 is journalled in the housing 11 itself, whereas a journal sleeve 21 for the shaft is pressed into the housing to the left of the worm screw 20.

A powerful and prestressed compression spring 22 is clamped between a spring cup 23 threaded into the housing 11 and a spring plate 24 coacting with the right hand end of the worm screw shaft 19; the spring 22 thus applies a strong force to the left in FIG. 2 on said shaft 19.

A control worm wheel or ring 25 meshing with a worm screw part of the control gear wheel 18, as most clearly appears from FIG. 3, is rotatably arranged on the worm screw shaft 19 and bears against the journal sleeve 21 with its right hand end (FIG. 2). The control worm ring 25 is provided with a pin 25' cooperating with a notch 26' in a clutch sleeve 26 to be described below.

The notch 26' is circumferentially somewhat larger than the worm ring pin 25', and the distance or play between these two parts is the so called control distance A for the mechanism corresponding to the desired slack or clearance between the brake drum and the brake linings.

The clutch sleeve 26 is at its left hand end provided with locking teeth meshing with corresponding teeth on a clutch ring 27 so as to form a one-way clutch 28 with a locking direction to be described.

The clutch ring 27 is by means of a thrust bearing 29 rotatably journalled relative to an end cover 30 threaded into the housing 11. The worm screw shaft 19 extends out of the end cover 30 and is sealed relative thereto by means of an O-ring 31. There is a tool grip 19' at the end of the shaft 19 for manual turning of the shaft 19, the worn screw 20 and thus the worm wheel 12.

At its inner surface the clutch ring 27 is provided with a conical serrated clutch surface for cooperation with a corresponding conical serrated clutch surface on the worm screw shaft 19 thus forming a conical clutch 32.

A torsion spring 33 in the form of a helical compression spring is arranged coaxial with the worm screw shaft 19 between the control worm ring 25 and the clutch sleeve 26, which both preferably are provided with smaller recesses for the spring ends. The main function of this spring 33 is to bias the two parts 25 and 26 angularly relative to each other, as will be described below, but also to keep the one-way clutch 28 engaged. The control clutch 32 on the other hand will normally be kept engaged by the compression spring 22.

Function

The function of the brake lever with the automatic slack adjuster as shown and described will now be studied. The basis is that the control arm 14 is attached to a fixed part of the vehicle underframe and that the piston rod 7 (FIG. 1) is retracted to a rest position as shown due to the absence of fluid under pressure in the brake cylinder 8. In the starting position the worm ring pin 25' is held in contact with the lower surface of the notch 26'. This position is not shown in FIG. 2, where the pin 25' for the sake of clarity is in contact with the upper notch surface leaving a distance A to the lower surface.

A. Brake application with excessive clearance

A. 1. The clearance part C of the application stroke

The brake cylinder piston rod 7 pushes the brake lever 6 to the left in FIGS. 1 and 2, whereas the control arm 14 remains stationary. A relative turning motion will hereby be imparted by way of teeth on the control disc 13 to turn control gear wheel 18 and in turn through its worm connection to turn the worm ring 25, so that when the clearance part C has been traversed the control distance A (corresponding to said part C) is consumed and the position depicted in FIG. 2 is reached, i.e. with the worm ring pin 25' in contact with the upper surface of the notch 26'. In this situation the brake linings 3 are still at a distance from the brake drum 2 due to the excessive slack or clearance.

A. 2. The excessive clearance part $C_e$

At the continued application stroke the clutch sleeve 26 is conveyed in a turning motion by the pin 25'. The locking direction of the one-way clutch 28 is such that this turning motion is allowed without any influence on the clutch ring 27. Concurrently herewith the S-cam 4 pushes the brake shoes 2 further apart, so that the brake linings 3 reach the brake drum 1.

A. 3. The entrance into the elasticity part E

As the brake linings 3 now are in contact with the brake drum 1 the further application stroke has the effect that a reaction force from the increased torque in the S-cam shaft 5 is transmitted to the worm screw 20 via the worm wheel 12 resulting in a slight axial relative displacement of shaft 19 to the right in FIG. 2 against the force of the spring 22 resulting in a disengagement of the force transmission in the conical clutch 32.

A. 4. The elasticity part E

At the continued application stroke in the elasticity part E the control mechanism consisting of the parts 13, 14, 18 and 25 continues to convey the clutch sleeve 26 but now also the clutch ring 27, as the conical clutch 32 is disengaged.

B. Brake release with excessive clearance

B. 1. The elasticity part E

During the first part of the release stroke, when the brake lever 6 moves in the direction against the arrow in FIG. 2, the torsion spring 33 continues to hold the worm ring pin 25' in contact with the upper surface of the notch 26' (as shown in FIG. 2). The control mechanism 13, 14, 18 and 25 causes the clutch sleeve 26 and the clutch ring 25 to turn together as a unit (in the opposite direction as compared to the direction during the application stroke) as the conical clutch 32 still is disengaged and the one-way clutch 28 is locked in this new rotational direction.

B. 2. Transition into clearance part

When at the return stroke the brake linings 3 leave the brake drum 1, the torque in the S-cam shaft 5 goes down to such an extent that the compression spring 22 is able to axially displace the worm screw shaft 19 to the left in FIG. 2, which means that the conical clutch 32 will engage lockingly.

B. 3. The clearance part corresponding to the control distance A

The force of the torsion spring 33 against the clutch sleeve 26 is not sufficient to overcome the one-way clutch 28 now when the conical clutch 32 is engaged. This means that the contact of the worm ring pin 25' changes from the upper to the lower surface of the notch 26'.

B. 4. Clearance adjustment

A further movement in the return direction corresponds to the excessive clearance, which will be reduced before the rest position of the whole system is again reached. The control mechanism 13, 14, 18 and 25 will, via the clutch sleeve 26, the locked one-way clutch 28, the clutch ring 27, and the locked conical clutch 32, turn the worm screw shaft 19 with the worm screw 20 and thus the worm wheel 12, which means that the brake lever 6 assumes a new angular position relative to the S-cam shaft 5. The gear ratio in the described system is such that only a certain portion of the excessive clearance will be eliminated at each brake operation. The risk for over-adjustment, for example due to heat expansion in the brake drum, will thereby be considerably reduced.

C. Brake operation with normal clearance

The description of the function above (with excessive clearance) is in principle valid also if the clearance is as desired or in other words corresponds to the control distance A in the mechanism. The following difference must, however, be noted:

At a brake application with normal clearance the brake linings 3 contact the brake drum 1 at the same time as the control distance A has been passed (see A.1.) or in other words as the worm ring pin 25' and the upper surface of the notch 26' contact each other. The further application stroke will be as described under A.3. and A.4., whereas the description under A.2. of course is not relevant in this situation.

During the release stroke the function will be as described as far as to B.3., when instead the following happens:

The control distance A is passed, which means that the contact of the worm ring pin 25' changes from the upper to the lower surface of the notch 26'. At the same time as this shaft is finished the brake lever 6 reaches its original neutral position. No adjustment occurs.

Setting of the fix-point

The position of the control arm 14 relative to the brake lever 6 is without importance with the design as shown and described. It need only be fixed (attached to a fixed part of the vehicle underframe). However, if the control arm 14 at the original mounting or after service is moved to a new starting position the following happens:

a. Counter-clockwise displacement

If the control arm 14 has been displaced in the counter-clockwise direction, this does not influence the function at all, which will be as described above under A, B and C.

b. Clockwise displacement

If on the other hand the control arm 14 has been displaced in the clockwise direction, the worm ring pin 25' has been moved to the upper surface of the notch 26'. The torsion spring 33 biases the clutch sleeve 26 in the opposite direction - the locking direction of the one-way clutch 28.

At the brake application stroke the brake lever 6 first passes the clearance part C corresponding to the control distance A in the mechanism. As the worm ring pin 25' already is in contact with the upper surface of the notch 26', the clutch sleeve 26 will be conveyed during the stroke. As the one-way clutch 28 is open in this direction, no further parts in the mechanism will however be influenced.

If there is any excessive clearance $C_e$ the function will be according to A.2. above. The following part of the brake operation as well as all following brake operations will be as described above.

Modifications are possible within the scope of the appended claims.

What is claimed is:

1. A brake lever adapted for angular movement for attachment to a splined S-cam shaft of an automotive drum brake and connection to a brake cylinder push rod for automatic brake adjustment in the clearance sensing mode comprising in combination, a worm wheel rotatably mounted in a housing of the brake lever and having internal splines for cooperation with the S-cam shaft, and an axially movable worm screw shaft rotatable in the housing perpendicular to the worm wheel and having a worm screw meshing with the worm wheel, and a mechanism establishing a reference point relative to the worm wheel rotation, a control arm carrying a control disc with peripheral gear teeth mounted coaxially with the worm wheel for transmitting a control movement from the reference point by means of a unit coupled between the control arm and axially movable shaft including an intermediate control gear wheel rotatable about an axis substantially perpendicular to the movable shaft meshing with the control disc gear teeth and teeth about a control ring gear wheel, which is thereby rotatable on the worm screw shaft as a function of the angular movement of the brake lever, a force transmitting path between the control ring and the worm screw shaft responsive to slack to automatically adjust the brakes including a one-way clutch with a sleeve and a clutch ring and torque limiting clutch means biased into engagement by spring means engaging and axially biassing the worm screw shaft, means permitting limiting movement of the control ring gear wheel on the worm gear shaft thereby introducing a control gap (A) permitting circumferential play between the control ring and the clutch sleeve as the brake lever moves from normal position which thereby prevents brake adjustment until the play is overcome, and spring means biasing the control ring and the clutch sleeve towards a predetermined initial relative circumferential position wherein the control ring is moved as said function of the brake lever movement by means of said unit coupled between the axially movable worm screw shaft the control ring gear wheel with said play in engagement with said intermediate control gear wheel rotatable about an axis substantially perpendicular to the movable shaft meshing therewith and with the control disc teeth.

2. A brake lever according to claim 1, wherein the one-way clutch has engageable lock teeth further comprising the last mentioned means as a helical compression spring arranged between the control ring and the clutch sleeve coupled as a torsion spring for establishing said initial relative circumferential position and also coupled as a compression spring for biasing the one-way clutch lock teeth clutch into engagement.

3. A brake lever according to claim 2, characterized in that the control ring and the clutch sleeve are provided with recesses for receiving the ends of the helical compression spring.

4. A brake lever according to claim 1, characterized in that the clutch between the clutch ring and the worm screw shaft is a serrated conical clutch.

* * * * *